(12) United States Patent
Ryton (10) Patent No.: US 12,097,767 B2
(45) Date of Patent: Sep. 24, 2024

(54) ELECTRIC VEHICLE SYSTEM COMPRISING A HYDRAULIC SYSTEM

(71) Applicant: EVECTEK, LTD., Par (GB)

(72) Inventor: George Ryton, Par (GB)

(73) Assignee: EVECTEK, LTD., Par (GB)

( * ) Notice: Subject to any disclaimer, the term of this patent is extended or adjusted under 35 U.S.C. 154(b) by 740 days.

(21) Appl. No.: 16/980,741

(22) PCT Filed: Mar. 12, 2019

(86) PCT No.: PCT/GB2019/050694
§ 371 (c)(1),
(2) Date: Sep. 14, 2020

(87) PCT Pub. No.: WO2019/175572
PCT Pub. Date: Sep. 19, 2019

(65) Prior Publication Data
US 2021/0008974 A1    Jan. 14, 2021

(30) Foreign Application Priority Data

Mar. 12, 2018  (GB) ..................... 1803947

(51) Int. Cl.
*B60K 7/00* (2006.01)
*B60K 1/04* (2019.01)
*B60L 50/60* (2019.01)
*B60K 17/356* (2006.01)
*B60T 1/10* (2006.01)

(52) U.S. Cl.
CPC .............. *B60K 7/0015* (2013.01); *B60K 1/04* (2013.01); *B60L 50/60* (2019.02); *B60K 2001/0422* (2013.01); *B60K 2001/0433* (2013.01); *B60K 2001/0438* (2013.01);
(Continued)

(58) Field of Classification Search
CPC ...... B60K 7/0015; B60K 1/04; B60K 17/356; B60K 2001/0422; B60K 2001/0433; B60K 2001/0438; B60K 2007/0038; B60L 50/60; B60T 1/10
See application file for complete search history.

(56) References Cited

U.S. PATENT DOCUMENTS 3,921,746 A * 11/1975 Lewus .................. B60G 13/14
                                                               180/165
6,023,134 A *  2/2000 Carl .......................... F02C 7/32
                                                                60/911
(Continued)

FOREIGN PATENT DOCUMENTS

EP       2729318 A1    5/2014
WO    2014145018       9/2014

*Primary Examiner* — John D Walters
(74) *Attorney, Agent, or Firm* — Weiss & Moy, PC; Jeffrey D. Moy (57) ABSTRACT

Disclosed is an electric vehicle with an architecture suitable for an electro-hydraulic propulsion that decouples the drive to allow greater freedom in the location of the major components for different types of vehicles and achieve optimal weight distribution and low centre of gravity. This brings fourth significant improvements in vehicle dynamics that improve basic performance driven by a lower centre of gravity and reduced polar moment which improves stability, braking, road holding and reduced tyre wear. The improvements increase basic corner speeds to the limit.

13 Claims, 13 Drawing Sheets

(52) U.S. Cl.
CPC .... *B60K 2007/0038* (2013.01); *B60K 17/356* (2013.01); *B60T 1/10* (2013.01)

(56) References Cited

U.S. PATENT DOCUMENTS

| | | | |
|---|---|---|---|
| 8,960,358 B2 * | 2/2015 | Sowards | F04B 49/065 |
| | | | 180/301 |
| 2015/0114739 A1 * | 4/2015 | Newman | B60L 58/15 |
| | | | 180/65.245 |

* cited by examiner

ELECTRIC VEHICLE SYSTEM COMPRISING A HYDRAULIC SYSTEM

This invention relates an electric vehicle with an architecture suitable for an electro-hydraulic propulsion. The invention results in an electric vehicle with specific performance and handling dynamics.

BACKGROUND OF THE INVENTION

In recent years and with advances in electrical devices and energy storage technologies and the general aim of societies to combat climate change has propelled and accelerated the development of electromobility. The introduction of low emissions or emissions-free zones in towns and a changed political framework will speed up its expansion. A number of entities are investing in electromobility and are enhancing existing concepts, introducing technological innovations and charting their future applications. This invention is part of this necessary evolution of the current solutions to electromobility to improve performance drivability and handling dynamics of electric vehicles.

The advantages of electromobility are widely known to people educated in the art and can be shown not only by their direct impact on reducing CO2 emissions and other harmful gases but also by their improved maintenance and reduced noise pollution.

In addition, in the near future, severely congested and polluted town centers will be turned into zero-emissions zones and thus only zero-emission vehicles will be able to drive through them.

Current electromobility solutions have a high degree of efficiency of up to 96%, compared with internal combustion engines that have an upper efficiency of 40%.

Efficiency is further improved by the ability of the propulsion motor to operate as a generator to recover braking energy to be re-used when needed.

On vehicle dynamics and handling, electromobility vehicles propulsion systems have full torque characteristics at standstill which allows them to accelerate faster than a vehicle with an internal combustion engine with a similar output.

The electromobility solutions drive system includes a few key components that are similar in function among all the available solutions:

An energy storage and its associated control
Electric motor/generator and associated control
Power transmission and control
Safety systems including the braking system
Vehicle climate control system The location of these various sub-systems varies between the solutions and mainly depend on the vehicle architecture that is pursued. There is however limited degrees of freedom in the location of the heavy components within the vehicles due to their weight and volumes driven by vehicle architecture and principally the transmission systems architectures.

SUMMARY OF THE INVENTION

According to the present invention, there is provided an electromobility system as defined in claim 1.

The system uses an electro/hydraulic architecture that decouples the drive from the transmission system. No internal combustion engine is included in the design; energy is principally added to the system via electrical charging, and optionally via pressurised air or gas.

The vehicle architecture allows greater degrees of freedom in the location of the major components for different types of vehicles to achieve optimal weight distribution and low centre of gravity. According to the present invention, the location of the motor/generator Power Unit drives the location of the centre of gravity and improves vehicle handling and road holding characteristics.

According to another aspect of the present invention, a hydraulic motor/pump unit is integrated with the wheel hub to reduce weight and complexity. This eliminates the need for any driveshafts and associated transmission components thus reduces overall part count and simplifying the complete mechanical design.

According to yet another aspect of the present invention, the motor/pumps are used to counterbalance the un-sprung weight of the vehicle thus reducing the timed frequency response in the springing and damping by significantly reducing inertia in the un-sprung weight factor. The weight of the motor/pump is counterbalanced against the weight of the wheel thus improving the vehicle dynamics.

Preferably, the motor/generator system can operate at substantially constant high-speed to reduce its size and weight and further improves the efficiency of the vehicle.

Preferably, the hydraulic storage system in combination with the battery storage provides redundant energy storage solutions The electromobility solution described in this has a modular construction for main mechanical/electrical components namely Energy storage, Motor/Generators and power transmission system to produce a multi variable platform to use for different types of vehicles.

The solution proposed herein uses an Electro/Hydraulic system that decouples the drive to allow greater freedom in the location of the major components for different types of vehicles and achieve optimal weight distribution and low centre of gravity.

The architecture proposed herein brings forth significant improvements in vehicle dynamics that improve basic performance i.e. lower centre of gravity, reduced polar moment (Radius of gyration). These improve stability, braking, road holding and tyre wear. Also, these improvements increase basic corner speeds to the limit, which would be a huge advantage in performance cars.

In one configuration the Motor/Generators Pump/Motor Wheel Hub Units being decoupled independent can be used to counterbalance the un-sprung weight of the vehicle thus reducing the timed frequency response in the springing and damping by significantly reducing inertia in the un-sprung weight factor. This will improve vehicle handling and road holding in all conditions.

The Motor/Generators being decoupled can be designed to run much faster than current solutions for reduced weight and volume. High-speed compact Permanent Magnet Motor/Generator can reduce size and weight and further improves the efficiency of the vehicle.

Using an Electro/hydraulic transmission approach opens the possibility to increase energy storage capability and by the use two types of the energy storage, namely a hydraulic storage and a battery storage systems. The hydraulic system is used to reduce the battery rate of charge and discharge at starting and braking and thus increases its life.

In the proposed system and in almost all circumstances the vehicle can be all-wheel drive.

The hydraulic storage system reduces the charge and discharge rate on the battery thus increasing its life.

The Accumulators in the hydraulic system can be charged independently by compressed air from on or off the vehicle to allow a further degree of freedom in supplying low cost energy to the drive system.

DETAILED DESCRIPTION OF THE INVENTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a propulsion architecture and its practical implementation in a standard and a sports vehicle. However, the devices and methods of the present invention are not limited to use in the specific applications that are described herein.

Figure 1:
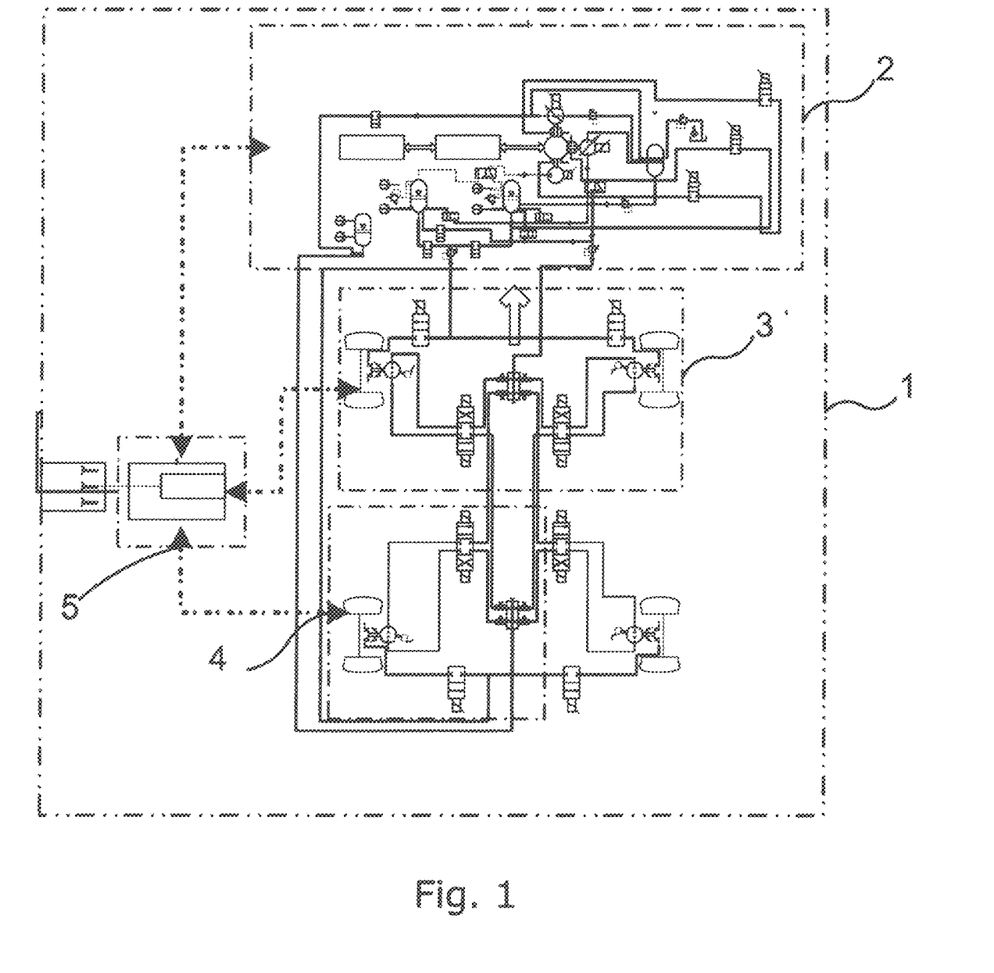
FIG. 1 is a schematic of the overall vehicle propulsion and the various subsystems.

Referring generally to FIG. 1 there is shown the schematic of an electromobility solution that uses hydraulic power as a mean of power distribution and control 1. The schematic is showing the key sub-systems and their interconnection, namely the power processing and storage sub-system 2, the power distribution and control 3, the in-wheel hydraulic motor/pump and its control interconnection 4, and finally the system controller and human interface 5.

Figure 2:
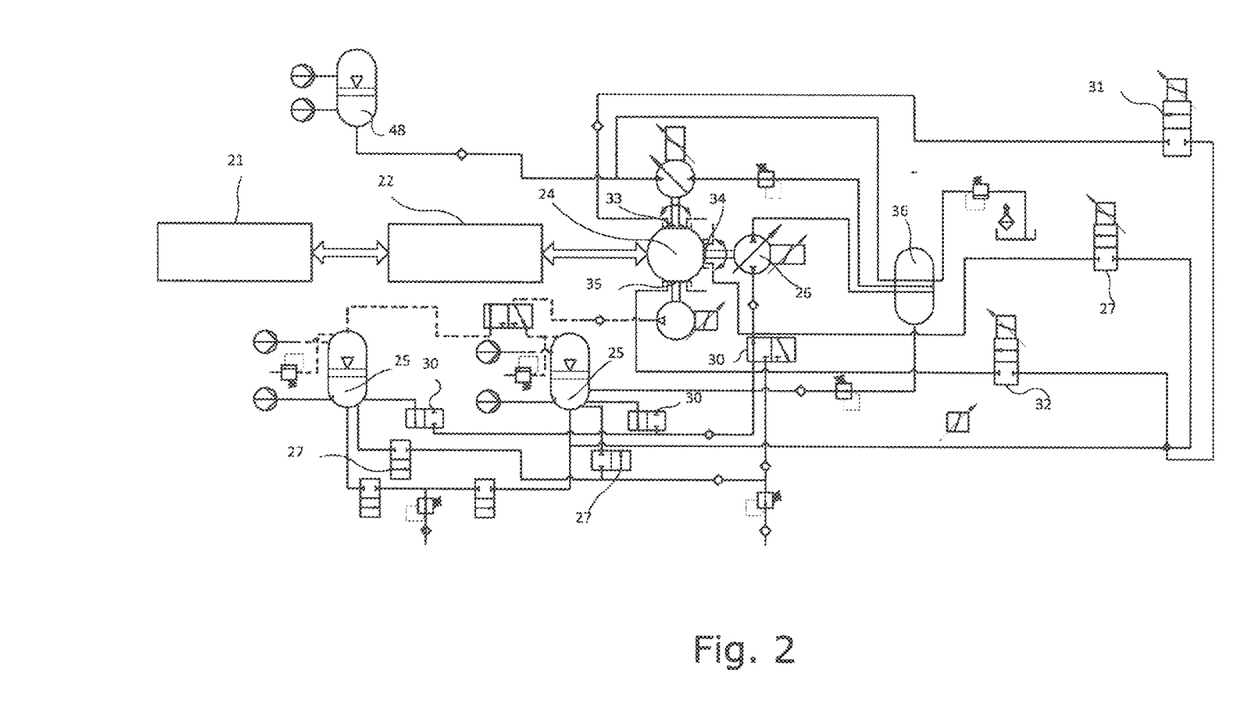
FIG. 2 is a detailed section of the schematic showing the interconnection between the motor generator and energy storage sub-systems.

The motor/generator associated converter and energy storage system is shown in FIG. 2. In motoring mode, the motor/generator 24 drives a motor/pump assembly 26. The motor/pump assembly 26 transmits pressurised hydraulic fluid, via valve assemblies 30, and can thereby pressurise the accumulators 25, and/or can transmit power to the motor/pump units 40, 41, 42 and 43, thereby driving the wheels 44, 45, 46 and 47. The flow and pressure of hydraulic fluid to the wheels are controlled by the valve assemblies 27, through the distributer manifold 39 and the three way Valves 35, 36, 37 and 38. The electrical power for this is taken from the battery 21 and processed by the bi-directional converter 22.

The control and engagement of the devices connected to the Motor/Generator 26 are controlled by the Valves 27, 31 and 32 and Clutches 33, 34 and 35 through the Control System 60. Hydraulic Fluid to the system is supplied from the Sealed Reservoir 36

Figure 3:
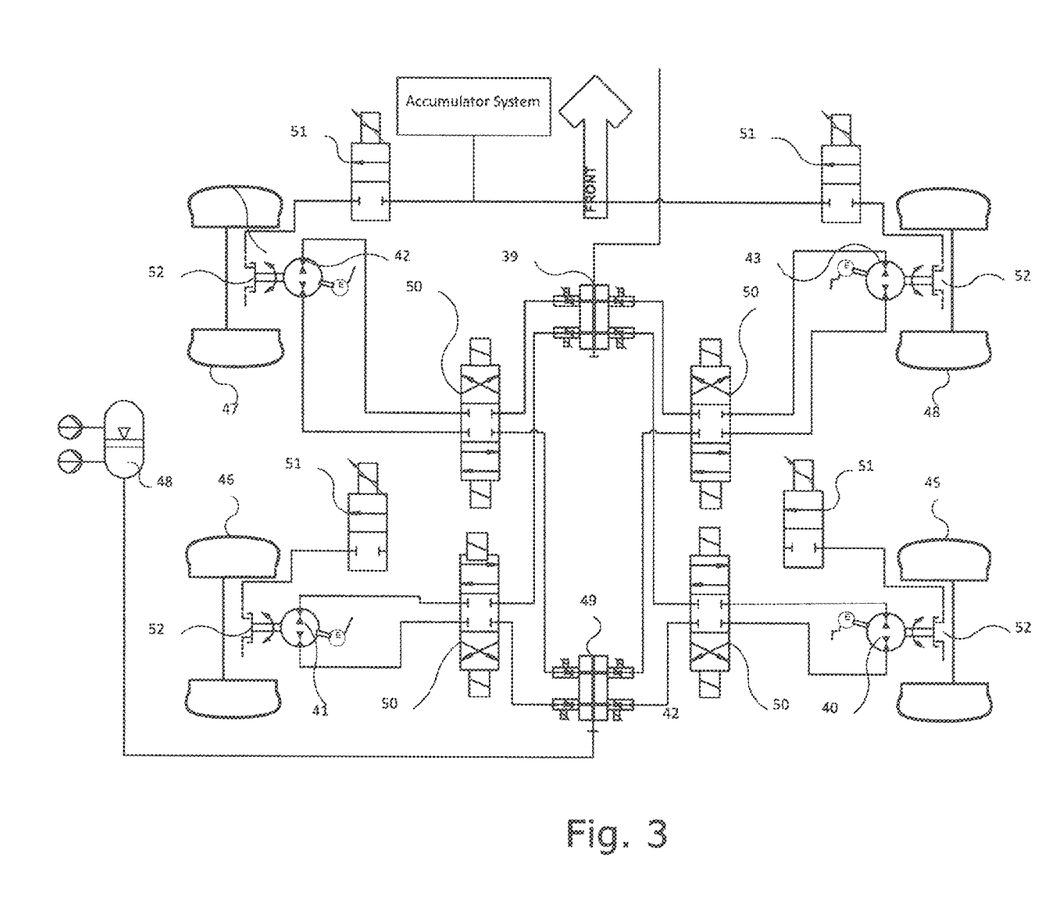
FIG. 3 is the detailed section of the schematic showing the hydraulic motor/pump mounted in the wheel hub and its interaction with the hydraulic power storage and the controlling valves.

Referring also to FIG. 3, during braking, the power is extracted from the four wheels 44, 45, 46 and 47 via the wheel-mounted motor/pump units 40, 41, 42 and 43. The operation of the brakes causes the hydraulic fluid in the brakes to become pressurised, and the flow and pressure thus generated during the brake by the wheel-mounted motor/pump unit is stored in the braking accumulator 48. The stored energy can either be kept in the accumulator or can be used to drive the main motor/pump assembly 26. This motive power can then be used to drive the motor generator 24 and the power generated may be processed by the bi-directional converter 22 to charge the battery 21. The logic of selecting storage versus charging the battery will be set to optimise the driving condition and the vehicle range. The logic for the optimal control of energy storage is embedded in the system controller 60.

The bi-directional controller converts power drawn from the battery into the required input for the motor generator; the conversion will depend on the battery and motor, but could for example the conversion of a DC battery output to a multiphase input for a switched DC motor. Likewise, the bi-directional controller will control the charging current energy from the motor generator (or the compressor of the accumulator) is to be stored in the battery.

Figure 4:
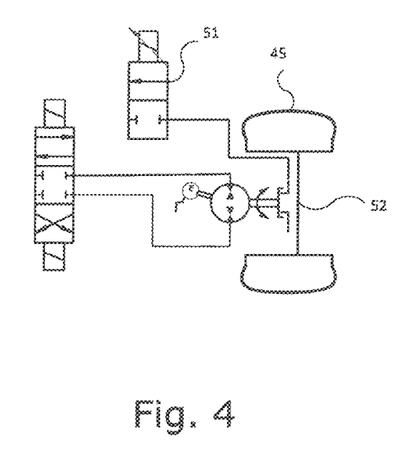
FIG. 4 is a further detail of the control of in-wheel hydraulic motor/pump.

Referring generally to FIG. 4 there is shown the wheel drive disconnect Clutches 52 and actuation 51 Valves. These are utilized when the vehicle is stationary and needs to be moved when not under power.

Figure 5:
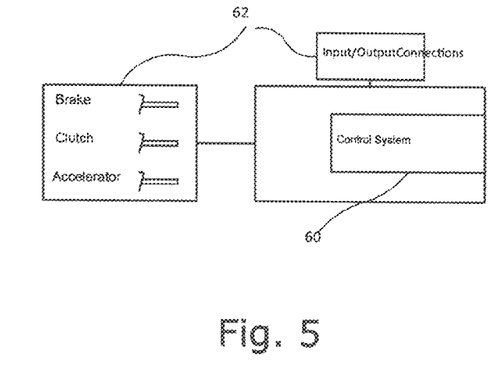
FIG. 5 is the detailed section of the schematic showing the controller and its interconnection with the various subsystems of the vehicle.

Referring generally to FIG. 5 there is shown the system controller 60 and its interconnection with the sub-systems 62. Signals from the brake, clutch and accelerator are input to the system controller 60, which then controls the bi-directional converter, the accumulator system, and the operation of the wheel motors. Other signals, such as steering controls, may also be processed by the system controller 60. The different signals input to the system 10 controller may be generated by a user (driver), or may be generated from an automated (driverless) system. It will also be appreciated that the sub-systems may be incorporated with the system controller, and equally that the system controller and sub-systems discussed herein could use a distributed architecture.

Figure 6:
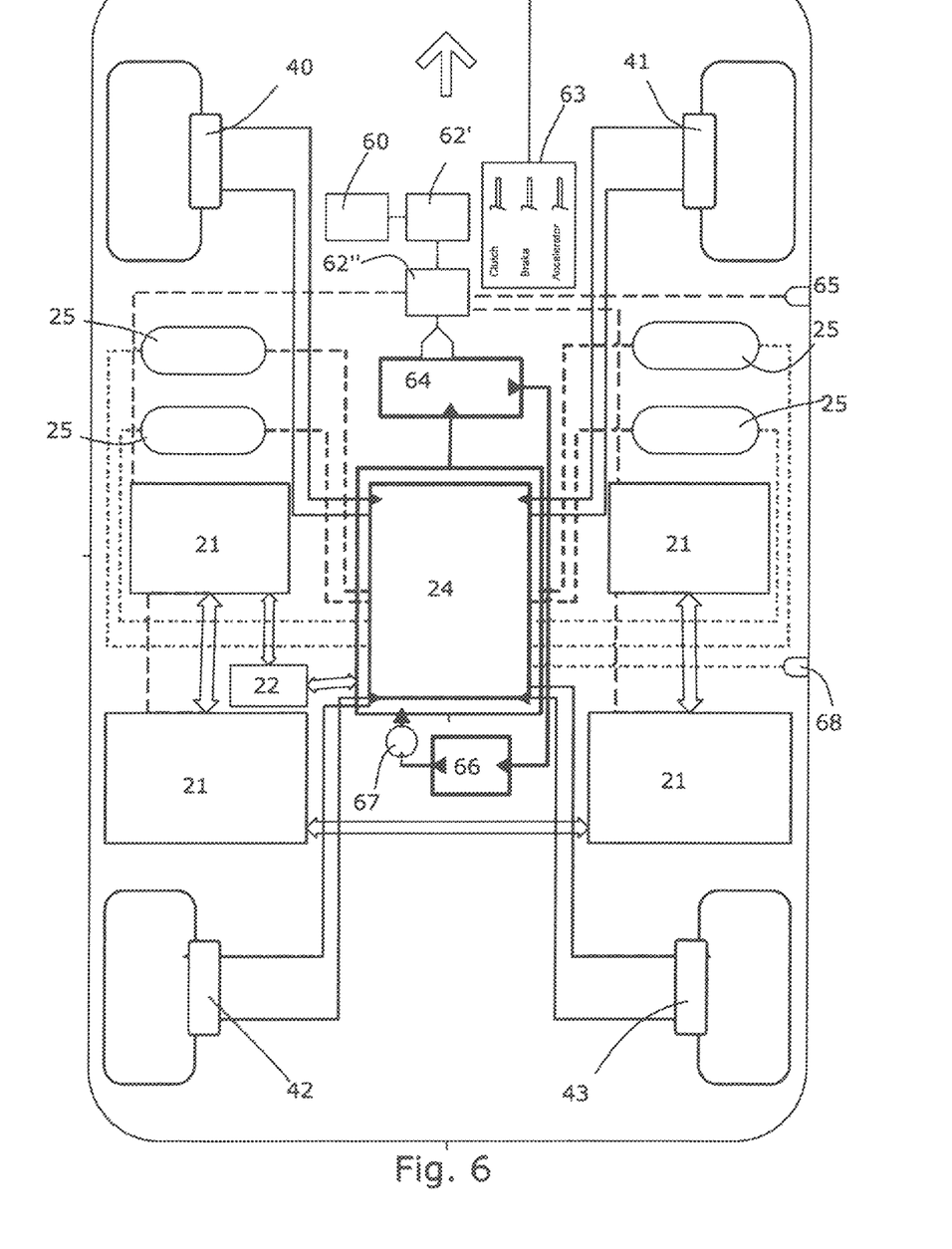
FIG. 6 is an overall depiction of the location of the various key components within the vehicle chassis.
Figure 7:
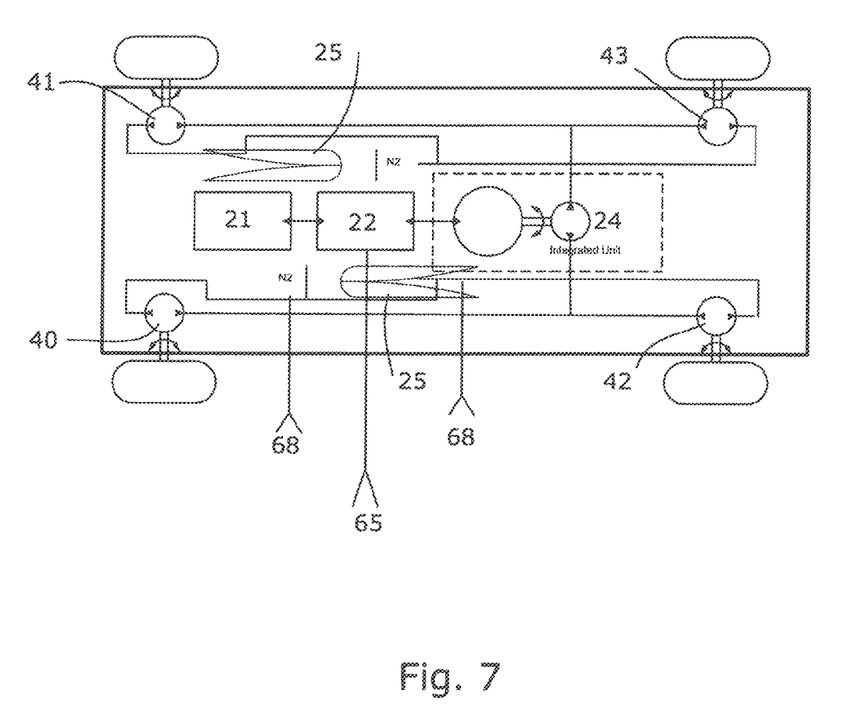
FIG. 7 is a diagrammatic representation of the components of the hydraulic system within the vehicle chassis.
Figure 8:
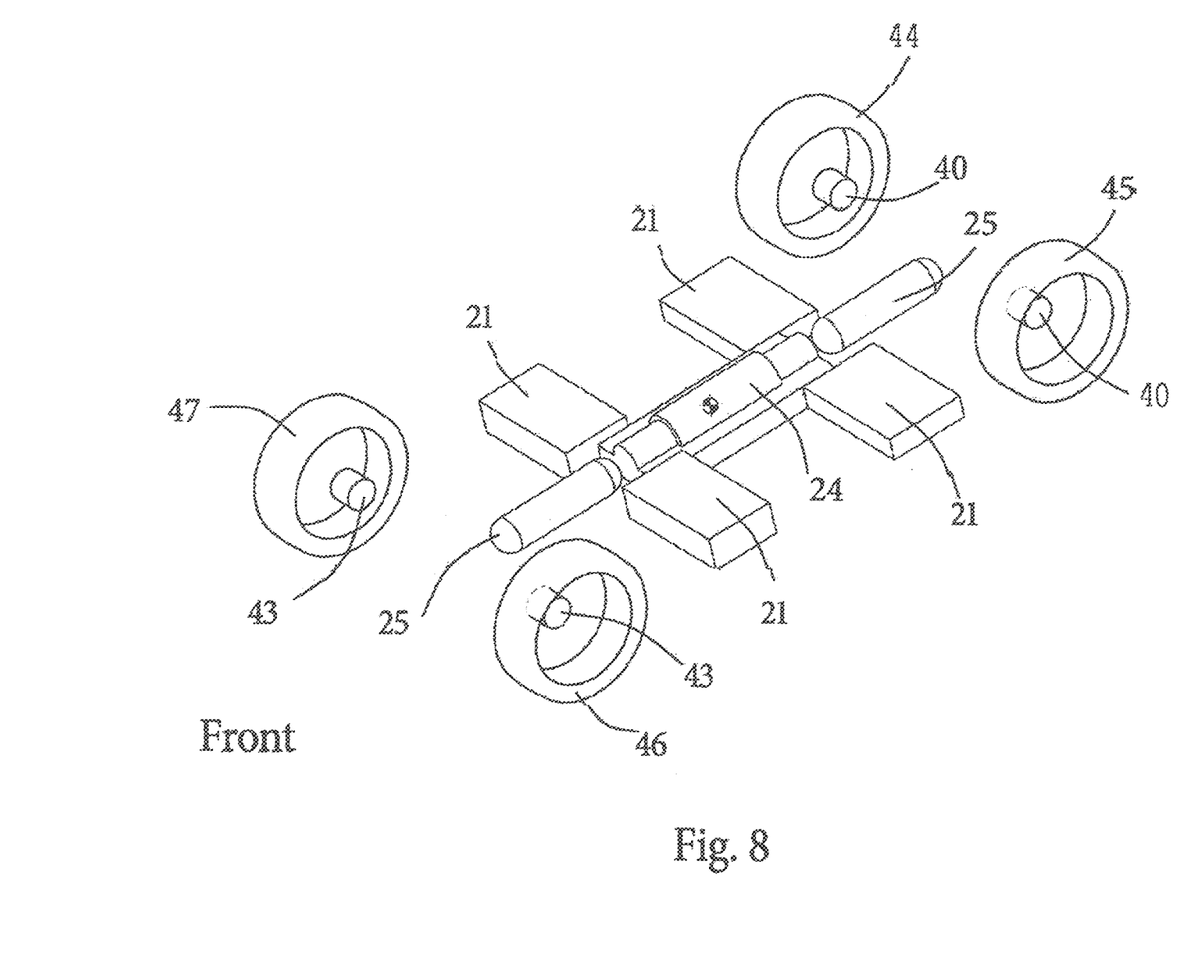
FIG. 8 is a perspective view of the vehicle showing the location of the key components shown in FIG. 4.

Referring to FIG. 6, FIG. 7 and FIG. 8 there is shown a schematic view of a potential implementation in a standard vehicle. The Motor/Hydraulic Integrated System 24 and distributed battery storage elements 21, which constitute much of the weight of the system, are located centrally between the front and the rear of the vehicle, below the seating for the driver and passengers, ensuring a low centre of gravity. The Motor/Hydraulic Integrated System 24 is connected to the wheel motor/pump units 40, 41, 42 and 43 to supply pressurised hydraulic fluid in a circuit. A control system 60 governs the system, and includes sub-systems including a battery control system 62', and charge controller 62". The control system 60 accepts inputs from the user control such as the brake, clutch and accelerator 63.

The principal method of inputting energy into the system is by means of an electric charge input, such as a conventional electric charging point 65. Additionally, excess heat from the Motor/Hydraulic Integrated System 24 is utilised by a heat to electric converter 64, and input into the electrical system via the charge controller 62". After heat has been extracted from the system by the heat to electric converter 64, the cooled fluid is returned to the 30 hydraulic system via a sealed hydraulic reservoir 66 and hybrid unit cooling system 67. The hydraulic system is insulated, for example using water jackets, particularly between the heat to electric converter 64 and sealed hydraulic reservoir 66.

As previously described, energy from the Motor/Hydraulic Integrated System 24 can either be used to pressurize the hydraulic fluid for the wheel hub motors, or to charge the batteries, or to pressurize the accumulators. A bi-directional converter 22 controls the energy flow between the batteries and the Motor/Hydraulic Integrated System 24. 5 The accumulators 25 are preferably diaphragm accumulators, the diaphragm separating the operating hydraulic fluid from pressurized air. The system operates the accumulators by adding pressurized air to the accumulators; however an additional option is to allow pressurised air to be added to the system, thereby adding energy to the system. This gives a flexibility to the methods of energizing the system as well as by charging the system electrically via the electric charging point 65, pressurised air or other gas may be added to the accumulators via an air charge input 68. This pressurizes the hydraulic fluid, which may either be used to power the wheel hub motors, or be converted into electricity to be stored in the batteries. A user then may ideally charge the vehicle by electric charging, but where this is not available, the vehicle may be charged by adding pressurised air or gas; although the energy density of the accumulators may be less than the batteries, this can provide enough energy to propel the vehicle for short distances, or to charge the batteries.

Figure 9:
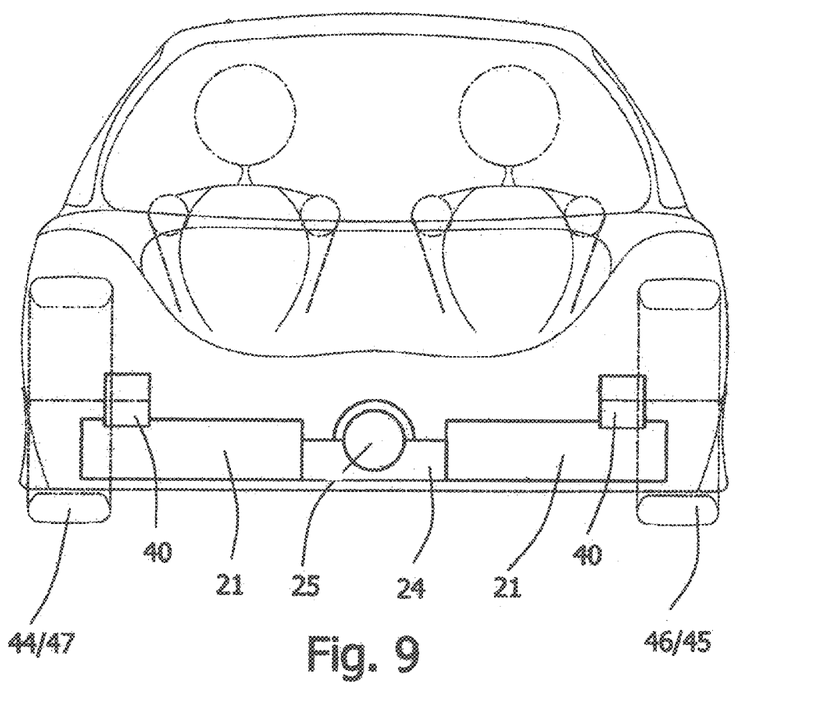
FIG. 9 is a front view of the vehicle showing the location of the key components shown in FIG. 4 according to an embodiment of the invention.
Figure 10:
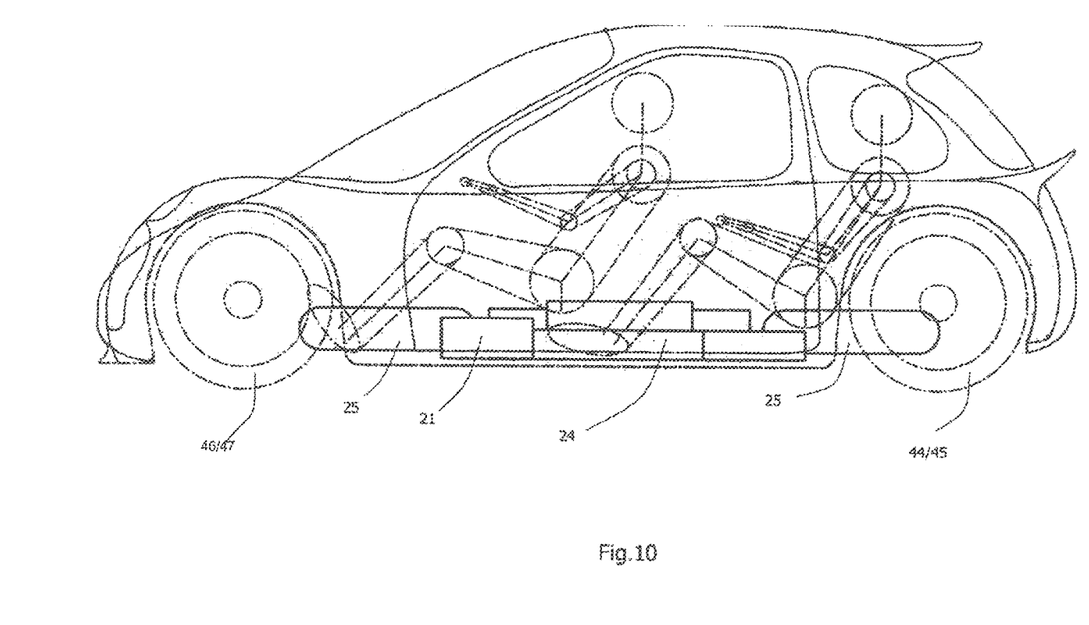
FIG. 10 is the side view of the vehicle showing the location of the key components shown in FIG. 9.
Figure 11:
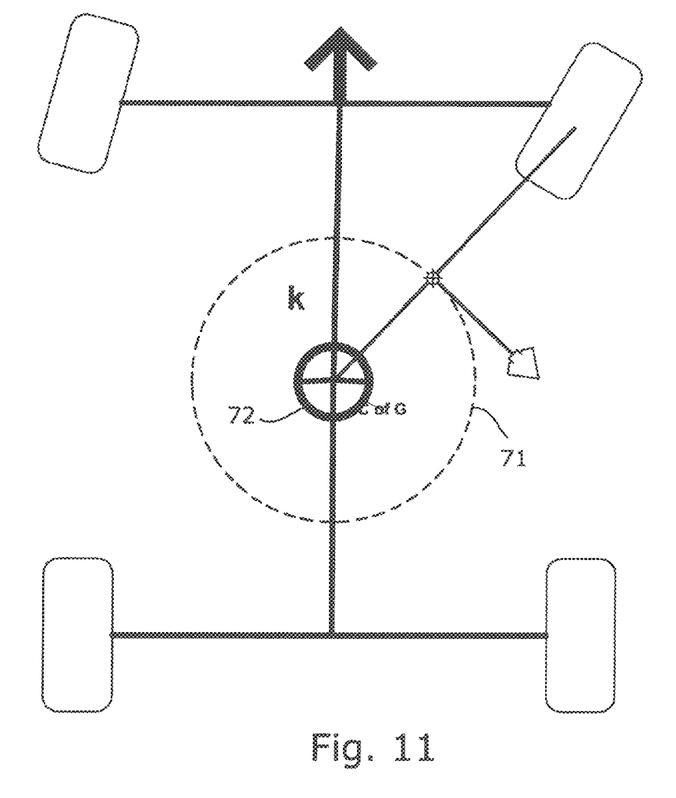
FIG. 11 is a diagrammatic view of the vehicle showing the centre of gravity and the centre of gyration.

Referring generally to FIG. 9 there is shown front view of the vehicle with the key sub-system locations. FIG. 10 there is shown side view of the vehicle with the key sub-system locations. Referring generally to FIG. 11 there is shown the reduction in radius of gyration of the proposed vehicle, 71. The shorter the radius the less load there will be on the tyres. This will reduce the load on the tyre patch as lateral acceleration forces are exerted on the centre of mass of the vehicle, 72, at a given speed. In standard use, less tyre wear, in performance, faster corner speeds before over-steer or understeer breakaway occurs.

Figure 12:
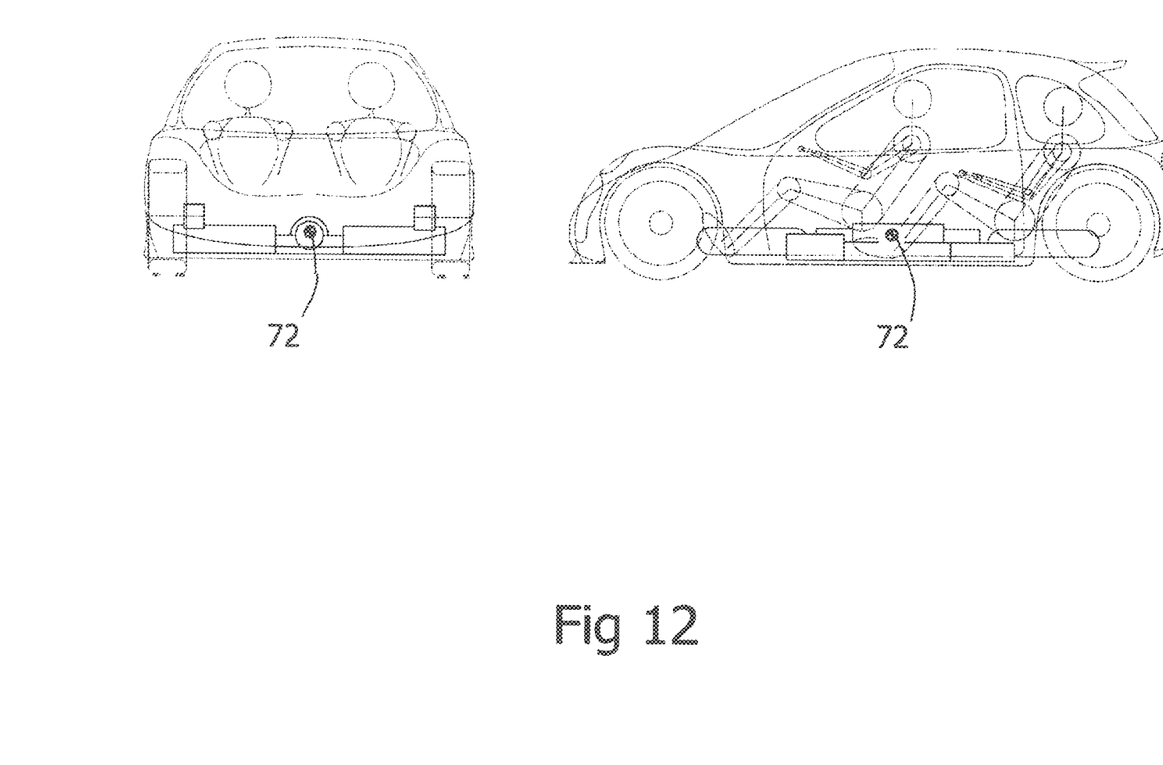
FIG. 12 is a front and side view of the vehicle showing the elevation of the centre of gravity.

Referring to FIG. 12, there is shown a lateral view of the vehicle indicating the elevation of the centre of gravity, 72. Lowering of the centre of gravity reduces the roll moment with a combination of a well-designed anti-dive, anti-lift and anti-squat elements of the vehicle. This attribute gives a much better stability control over these elements giving less inertial load in a change of direction of the vehicle. In standard use leads to less tyre wear, in 5 performance, faster corner speeds before oversteer or understeer breakaway occurs.

Figure 13:
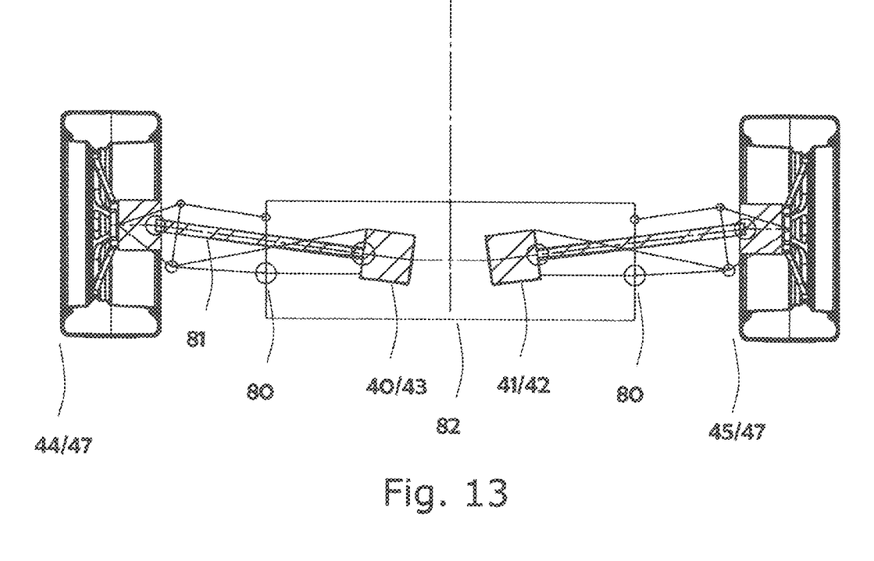
FIG. 13 shows an alternative embodiment of the wheel drive motor/pump, where the motor/pump is mounted off the wheel, and the wheel and motor/pump are counterbalanced.

Referring generally to FIG. 13 there is shown the details of the motor/pump mounting in relation to the wheel. As shown and based on the location of the pivot 80, the motor/pump counterbalances the weight of the wheel assembly 42 thus improving the overall dynamics of the vehicle by reducing the inertia when the wheel is put into vertical motion from the uneven road surface. This will improve the ride quality of the vehicle as well as the overall dynamic performance by improving the damping characteristics.

Although illustrated and described here for four wheel drive car/automobile, the principles discussed herein could equally be applied to two wheel drive cars, to motor cycles (either as a one wheel drive or two wheel drive system), and to, articulated vehicles.

The invention claimed is:

1. An electric vehicle system comprising
a hydraulic system including a hydraulic motor/pump;
a propulsion system: comprising:
an electric motor/generator driving or driven by the hydraulic motor/pump for providing hydraulic power for the propulsion of the vehicle
at least one accumulator in hydraulic communication with the hydraulic motor/pump capable of storing and supplying hydraulic fluid as commanded by a vehicle control system;
a plurality of wheel drive motor/pump units that transfer energy to vehicle wheels when supplied by hydraulic power transfer energy back to the hydraulic system, each wheel drive motor/pump having a separate control valve means to allow independent hydraulic control of that wheel drive;
a valve system to control the flow between the propulsion system, the wheel mounted motor/pump unit and the at least one accumulator;
at least one battery system to supply and store electrical energy as commanded by the vehicle control system;
a bidirectional converter for the control of the motor generator and transferring power between the electrical energy storage and the hydraulic system;
and not including an internal combustion engine;
wherein the at least one accumulator includes a compressor and so that the accumulator is capable of being charged either by inputting hydraulic pressure or via the compressor.

2. The propulsion system according to claim 1, wherein the electric motor/generator coupled to a hydraulic motor/pump decoupled from the wheel mounted motor/pumps.

3. The bi-directional converter according to claim 1, wherein said converter manages power conversion and transfer between the said motor/generator and the battery system.

4. The accumulator system according to claim 1, wherein said accumulator system stores recovered or excess hydraulic power to be used with the said propulsion system during acceleration or start without using the battery storage.

5. The valve system according to claim 1, wherein said valves control the hydraulic fluid flow between the said propulsion and storage subsystems.

6. The wheel drive motor/pump unit according to claim 1, wherein said unit are used to drive the wheels and counterbalance the unsprung weight of the vehicle.

7. The wheel drive motor/pump unit according to claim 1, wherein said unit Is are in-wheel mounted.

8. The wheel mounted motor/pumps according to claim 1, wherein said drives recover hydraulic power during breaking and store it in the said hydraulic accumulator.

9. The control system according to claim 1, wherein said controller optimises operation of the various subsystems depending on the operating conditions.

10. The control system as recited in claim 1, wherein said control system responds to driver commands or alternatively responds to commands from a driverless system.

11. The accumulator system according to claim 1, wherein said accumulator allows the direct input of pressurized air or gas to add energy to the system.

12. An electric vehicle system according to claim 1, wherein the hydraulic motor/pump unit is integrated with the wheel hub.

13. The propulsion system according to claim 1, wherein said propulsion system decoupled from the wheel mounted drives is located in the centre of the said vehicle to lower centre of gravity.

* * * * *